(12) United States Patent
Morey et al.

(10) Patent No.: US 10,746,069 B2
(45) Date of Patent: Aug. 18, 2020

(54) EXHAUST SYSTEM FOR A WORK VEHICLE

(71) Applicant: CNH Industrial America LLC, New Holland, PA (US)

(72) Inventors: Daniel Alan Morey, Mundelein, IL (US); Kaushal Ghorpade, Chicago, IL (US); Kain Knowles, Chicago, IL (US); Nikolay Popov, Elk Grove Village, IL (US); Panos Tamamidis, Northbrook, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/966,921

(22) Filed: Apr. 30, 2018

(65) Prior Publication Data

US 2019/0331016 A1   Oct. 31, 2019

(51) Int. Cl.
   *F01N 13/04*   (2010.01)
   *F01N 3/20*   (2006.01)
   *F01N 1/08*   (2006.01)
   *F01N 3/28*   (2006.01)

(52) U.S. Cl.
   CPC ............ *F01N 3/2066* (2013.01); *F01N 1/088* (2013.01); *F01N 3/2803* (2013.01); *F01N 2560/026* (2013.01); *F01N 2590/08* (2013.01)

(58) Field of Classification Search
   CPC ...... F01N 1/088; F01N 13/011; F01N 13/017; F01N 13/141; F01N 13/143
   See application file for complete search history.

(56) References Cited

U.S. PATENT DOCUMENTS

| | | | | |
|---|---|---|---|---|
| 2003/0051449 | A1* | 3/2003 | Nishiyama | F01N 3/0814 55/309 |
| 2012/0144809 | A1* | 6/2012 | Ducroquet | F01N 3/2066 60/295 |
| 2012/0216515 | A1* | 8/2012 | Norton | F01N 13/04 60/299 |
| 2013/0340417 | A1* | 12/2013 | Morey | F01N 3/36 60/317 |
| 2016/0160727 | A1* | 6/2016 | Isada | F01N 3/2066 60/301 |
| 2019/0055876 | A1* | 2/2019 | Willats | F01N 3/2066 |

* cited by examiner

*Primary Examiner* — Jonathan R Matthias
(74) *Attorney, Agent, or Firm* — Rickard K. DeMille; Rebecca L. Henkel

(57) ABSTRACT

An exhaust system for a work vehicle includes a selective catalytic reduction (SCR) assembly that includes an SCR module. The SCR module includes a first exhaust flow path and a second exhaust flow path. The SCR assembly also includes an inlet configured to receive a flow of an exhaust solution, to direct a first portion of the exhaust solution to the first exhaust flow path, and to direct a second portion of the exhaust solution to the second exhaust flow path. The SCR assembly further includes an outlet mixer configured to receive the first and second portions of the exhaust solution and to direct the first and second portion of the exhaust solution out of the SCR assembly. The outlet mixer includes one or more features configured to mix the first and second portions of the exhaust solution.

18 Claims, 8 Drawing Sheets

US 10,746,069 B2

EXHAUST SYSTEM FOR A WORK VEHICLE

BACKGROUND

The present disclosure relates generally to work vehicles (e.g., agricultural vehicles) with diesel engines, and more particularly, to an exhaust system configured to reduce emissions from a diesel engine of a work vehicle.

Certain work vehicles (e.g., agricultural vehicles) are powered by diesel engines, which burn diesel fuel and produce exhaust gas. The exhaust gas may include undesirable byproducts such as nitrogen oxides (NOx), carbon monoxide, and particulate material. Certain work vehicles include an exhaust system that reduces the concentration of the undesired byproducts. Traditional exhaust systems may spray a diesel exhaust fluid (DEF) collinearly within the flow of exhaust gas or against a wall of a mixer. Government regulations have reduced the acceptable concentrations of the byproducts within the exhaust gas, particularly in relation to NOx. Traditional exhaust systems may not be able to satisfy new or future regulatory requirements. Additionally, larger exhaust systems are undesirable because they may block or interfere with sightlines of the operator of a work vehicle.

BRIEF DESCRIPTION

In certain embodiments, an exhaust system for a work vehicle includes a selective catalytic reduction (SCR) assembly that includes an SCR module. The SCR module includes a first exhaust flow path and a second exhaust flow path. The SCR assembly also includes an inlet configured to receive a flow of an exhaust solution, to direct a first portion of the exhaust solution to the first exhaust flow path, and to direct a second portion of the exhaust solution to the second exhaust flow path. The SCR assembly further includes an outlet mixer configured to receive the first and second portions of the exhaust solution and to direct the first and second portions of the exhaust solution out of the SCR assembly. The outlet mixer includes one or more features configured to mix the first and second portions of the exhaust solution.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
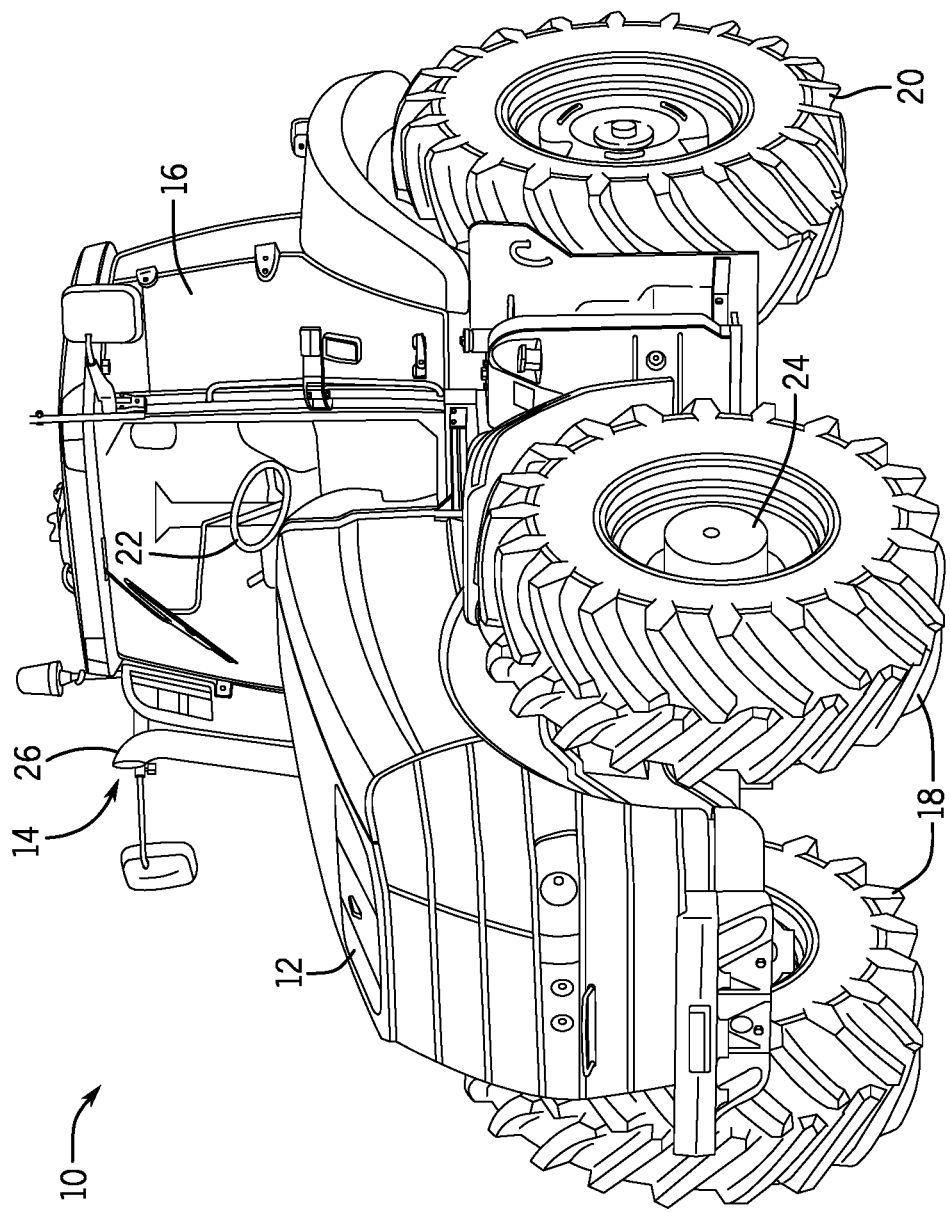
FIG. 1 is a perspective view of an embodiment of a work vehicle which includes an exhaust system for a diesel engine.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Various embodiments of the present disclosure include an exhaust system for a diesel engine of a work vehicle (e.g., an agricultural vehicle). As regulations regarding exhaust emissions continue to become more stringent regarding the concentration of expelled byproducts (e.g., nitrogen oxides), manufacturers strive to produce more effective and efficient exhaust systems. Certain exhaust systems are configured to introduce a sprayed fluid (e.g., DEF) into the diesel exhaust to aid in the reduction of nitrogen oxides (NOx) from the exhaust. To ensure efficient dosing of DEF into the diesel exhaust, concentrations of byproducts, particularly in relation to NOx, are measured within the exhaust gas at the outlet of a selective catalytic reduction (SCR) module of the exhaust system. If exhaust gases output from multiple catalysts within the SCR module are not mixed homogenously at the outlet of the SCR module, the measurement of NOx by an outlet sensor may be dominated by the exhaust gases from one of the catalysts. Measuring the NOx within the exhaust gas may result in a measurement error of the NOx, which may cause over-injection of DEF into the diesel exhaust, thereby increasing operating cost (i.e., increasing consumption of DEF) by the exhaust system.

As discussed in detail below, the exhaust system of the present disclosure includes an outlet mixer pipe for an SCR module (e.g., an SCR on filter (SCRoF) muffler). The outlet mixer pipe extends into an outlet chamber within the SCR module and includes one or more features to encourage the mixing of a first portion of an exhaust solution from a first exhaust flow path and a second portion of the exhaust solution from a second exhaust flow path before the first portion of the exhaust solution and the second portion of the exhaust solution reach one or more sensors. Such features may include one or more slots within a wall of the outlet mixer pipe, one or more vanes on the wall of the outlet mixer pipe, one or more perforations within an end of the outlet mixer pipe, or any combination thereof. The inclusion of the features described herein within the outlet mixer pipe may increase the turbulence in the first portion of the exhaust solution, the second portion of the exhaust solution, or both, within the outlet mixer pipe. Thus, the composition of the mixture of the first portion of the exhaust solution and the second portion of the exhaust solution at the sensor(s) within the outlet mixer pipe is more homogeneous (e.g., as compared to the first portion of the exhaust solution and the second portion of the exhaust solution that flow directly from the respective catalysts to the outlet pipe), which results in a more accurate measurement of the amount or the concentration of byproducts within the mixture. In certain embodiments, vanes included in the outlet mixer pipe may extend toward the center of the outlet mixer pipe to facilitate coupling the outlet mixer pipe to the SCR module housing through an opening in the exterior of the SCR module housing. Although the preceding list of features are described in detail herein, other features may be included in the outlet pipe that facilitate the mixing of the first portion of the exhaust solution and the second portion of the exhaust solution. Further, the selection of the features included in the outlet pipe may depend on a target homogeneity of the mixture of first and second portions of the exhaust solution at the outlet sensor(s). For example, the inclusion of slots within the wall of the outlet pipe may achieve a different distribution of the mixture of the first and second portions of the exhaust solution at the outlet sensor(s) within the outlet mixer pipe than the inclusion of vanes on the wall of the outlet pipe.

Because the outlet mixer pipe of the present disclosure provides increased homogeneity of the exhaust solution from multiple catalysts, the outlet sensor(s) provide a more accurate measurement of the byproducts within the exhaust solution, particularly in relation to NOx. The more accurate measurement of the byproducts facilitates efficient mixing of DEF and exhaust gas to enable the exhaust system to consume less DEF, thereby reducing the cost to operate the exhaust system. Furthermore, in various embodiments of the present disclosure, the exhaust system reduces the amount of backpressure added across the exhaust system (e.g., as compared to a blade outlet mixer or a helix outlet mixer), thereby increasing the efficiency of the engine. The engine efficiency is increased by directing more of the engine's power to rotational motion rather than forcing exhaust gas through the exhaust system. By increasing engine efficiency, the engine may provide more power to the work vehicle while consuming less fuel, thereby further decreasing emissions.

FIG. 1 is a perspective view of an embodiment of a work vehicle 10 which includes an exhaust system for a diesel engine. In certain embodiments, the work vehicle 10 may be a tractor, off-road vehicle, agricultural work vehicle, or any other suitable vehicle that may include an exhaust system for a diesel engine. The illustrated work vehicle 10 has a body 12 that may house an engine (e.g., diesel engine), transmission, cooling system, and power train. The body 12 also houses a portion of an exhaust system 14. Further, the work vehicle 10 has a cabin 16 where an operator may sit or stand to operate the work vehicle 10. The work vehicle 10 has two front wheels 18 and two rear wheels 20 that rotate to move the work vehicle 10. In certain embodiments, the work vehicle 10 is maneuvered using a steering wheel 22 that causes the front wheels 18 to turn. As illustrated, the front wheels 18 are coupled to an axle 24 (e.g., fixed or suspended) that supports the front wheels 18, and facilitates wheel rotation. The exhaust system 14 may be routed around various systems within the body 12, such as a cooling system. The exhaust system 14 includes an exhaust pipe 26 which carries the exhaust gas away from the body, and directs the exhaust gas away from the cabin 16.

Figure 2:
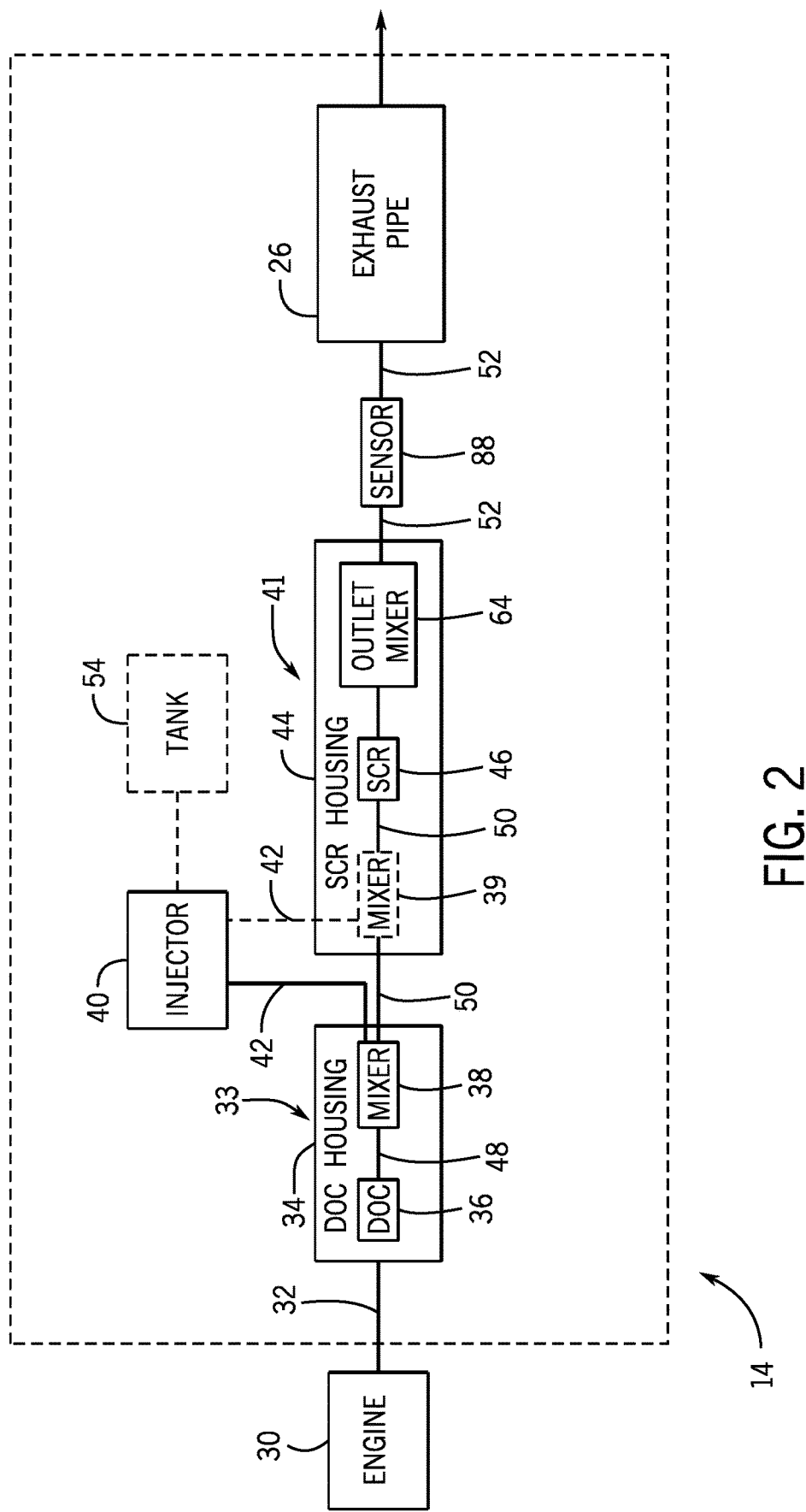
FIG. 2 is a schematic view of an embodiment of an exhaust system that may be employed within the work vehicle of FIG. 1.

FIG. 2 is a schematic view of an embodiment of an exhaust system 14 that may be employed within the work vehicle of FIG. 1. In the illustrated embodiment, an engine 30 expels exhaust gas 32 to the exhaust system 14. In the illustrated embodiment, the exhaust system 14 includes a diesel oxidation catalyst (DOC) assembly 33 having a housing 34 containing a DOC 36 and a DOC mixer 38. The exhaust system 14 also includes an injector 40 for injecting diesel exhaust fluid (DEF) 42 into the mixer 38. The exhaust system 14 also includes a selective catalytic reduction (SCR) assembly 41 having an SCR housing 44 containing an SCR mixer 39 and an SCR module 46. Certain embodiments of the exhaust system 14 may additionally include a diesel particulate filter to capture particulate matter, a muffler, or any other element suitable for use in an exhaust system.

The DOC housing 34 receives exhaust gas 32, and directs the exhaust gas 32 into the DOC 36. The DOC 36 receives the exhaust gas and catalyzes the oxidization of carbon monoxide to carbon dioxide by using excess oxygen in the exhaust gas 32. In addition, the DOC 36 uses excess oxygen to catalyze the conversion of hydrocarbons to water and carbon dioxide. In certain embodiments, the DOC 36 may use ceramics, metals (e.g., platinum, palladium, etc.), or other suitable catalysts to catalyze the oxidization of the hydrocarbons and carbon monoxide molecules. Thus, the DOC 36 receives raw exhaust gas 32 and outputs catalyzed exhaust gas 48 with reduced concentrations of hydrocarbons and carbon monoxide. The DOC housing 34 directs the catalyzed exhaust gas 48 to the DOC mixer 38, which is enclosed within the DOC housing 34. The DOC mixer 38 receives the DEF 42 from the injector 40, in addition to the catalyzed exhaust gas 48 from the DOC 36. In certain embodiments, the exhaust system 14 includes a tank for containing the DEF 42, and supplying the DEF to the injector 40. Alternatively, the injector 40 may include a tank 54 containing DEF 42. In further embodiments, the tank 54 containing the DEF 42 may be remote from the injector 40.

The injector 40 sprays the DEF 42 into the exhaust gas 48 within the DOC mixer 38. The DEF 42 is a solution used to aid in the reduction of NOx within the exhaust gas 48. For example, in certain embodiments, the DEF 42 may be an aqueous urea solution which undergoes thermal decomposition and hydrolysis within the exhaust system 14 to produce ammonia, which the SCR assembly 41 uses to convert the NOx into nitrogen and water. The DOC mixer 38 provides an initial mixing of the catalyzed exhaust gas 48 and the DEF 42. Then, the catalyzed exhaust gas and DEF mixture travels to the SCR housing 44 and may pass through the optional SCR mixer 39 that provides additional mixing to the catalyzed exhaust gas 48 and DEF 42. The optional SCR mixer 39 may supply well-mixed exhaust solution 50 to the SCR module 46. The SCR module 46 receives the exhaust solution 50 and uses the distributed DEF 42 to reduce the NOx concentration in the exhaust gas. As described further below, the outlet mixer 64 (e.g., outlet mixer pipe 64) receives the exhaust solution 50 from the SCR module 46 and further mixes the exhaust solution 50. Thus, the outlet mixer 64 outputs an enhanced homogeneous or mixed exhaust solution 52 with a reduced NOx concentration (e.g., processed exhaust 52) through the exhaust pipe 26 to be released into the atmosphere. Further, sensor(s) 88 measure certain characteristics of the processed exhaust 52 as the processed exhaust 52 flows to the exhaust pipe 26, as further described herein.

Figure 3:
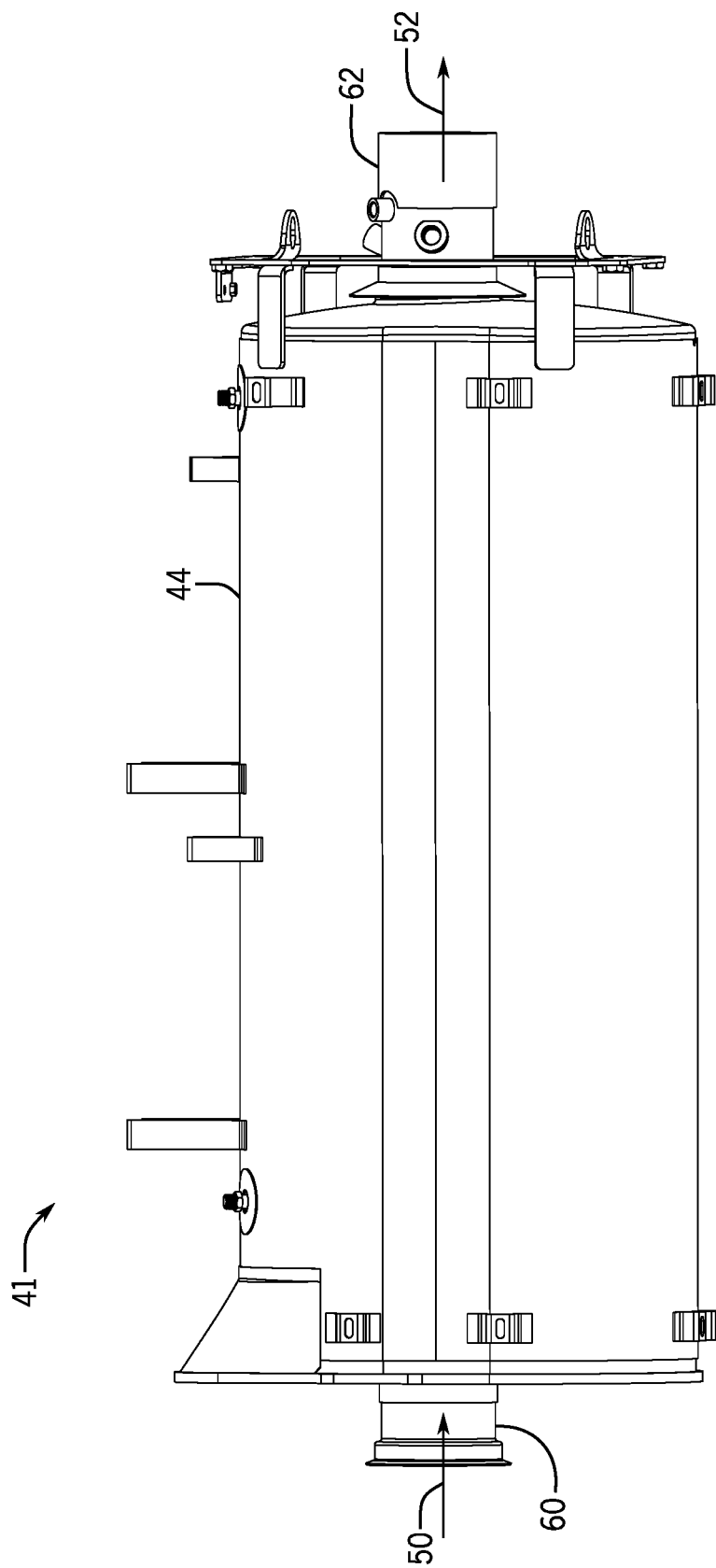
FIG. 3 is a perspective view of an embodiment of a selective catalytic reduction (SCR) assembly that may be employed within the exhaust system of FIG. 2.

FIG. 3 is a perspective view of an embodiment of an SCR assembly 41 that may be used within the exhaust system of FIG. 2. A housing 44 of the SCR assembly 41 has a cylindrical shape. However, the SCR assembly housing 44 may have any suitable configuration that facilitates the operation of the SCR assembly 41 as described herein. The SCR assembly 41 receives the exhaust solution 50 from DOC mixer 38 through inlet 60 and outputs processed exhaust 52 with a reduced NOx concentration through outlet 62 to the exhaust pipe 26.

Figure 4:
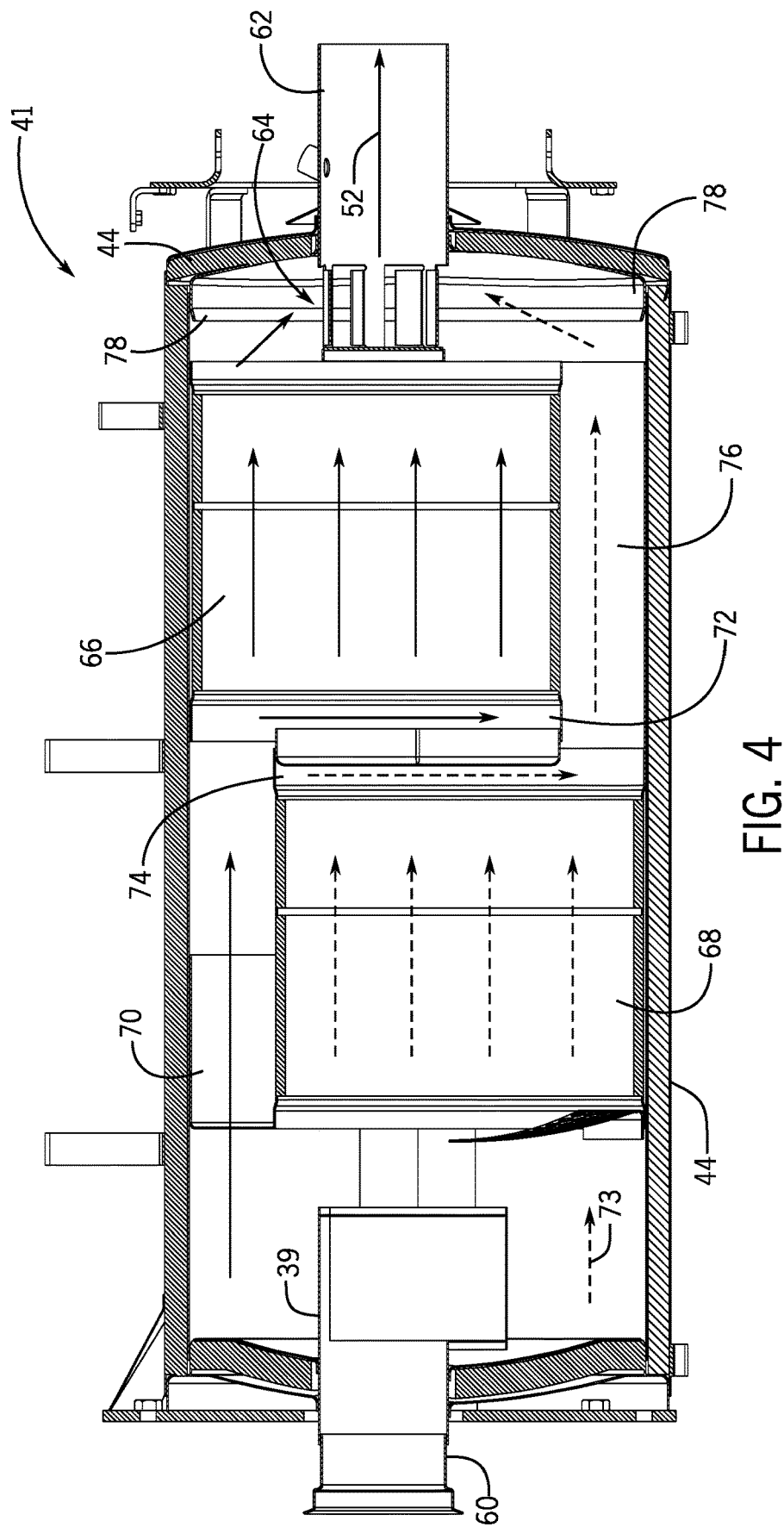
FIG. 4 is a cross-sectional view of the SCR assembly of FIG. 3 illustrating the flow of exhaust solution through the SCR module.

FIG. 4 is a cross-sectional view of the SCR assembly 41 of FIG. 3 illustrating the flow of exhaust solution 50 through the SCR module 41. As the exhaust solution 50 enters the SCR assembly 41 via the inlet 60, the inlet 60 directs the exhaust solution 50 to optional SCR mixer 39. A first portion of the exhaust solution 50 then flows to a first exhaust flow path (e.g., depicted by solid arrows) within the SCR module 46 and a second portion of the exhaust solution flows to a second exhaust flow path (e.g., depicted by dashed arrows) within the SCR module 46. The first exhaust flow path passes through passages 70, 72 to a first catalyst 66 within the SCR module 46. As illustrated, the first exhaust flow path passes through a first passage 70 and a second passage 72, substantially perpendicular to the first passage 70, before flowing through the first catalyst 66. After flowing through the first catalyst 66, the first exhaust flow path enters a mixing region 78 within the SCR assembly housing 44. Concurrently, the second exhaust flow path passes within the SCR module 46 to a second catalyst 68, as illustrated by dashed arrow 73. The second exhaust flow path passes through passages 74, 76 after flowing through the second catalyst 68. As illustrated, the second exhaust flow path passes through a first passage 74 and a second passage 76, substantially perpendicular to the first passage 74, after flowing through the second catalyst 68. After the second exhaust flow path has flowed through the passages 74, 76, the second exhaust flow path enters the mixing region 78 within the SCR assembly housing 44. As the first exhaust flow path and the second exhaust flow path enter the mixing region 78, the first portion of the exhaust solution 50 from the first exhaust flow path and the second portion of the exhaust solution 50 from the second exhaust flow path mix or combine into processed exhaust 52. The first exhaust flow path and the second exhaust flow path are sealed such that the first portion of the exhaust solution 50 flowing through the first exhaust flow path and the second portion of the exhaust solution 50 flowing through the second exhaust flow path do not combine or mix before entering the mixing region 78. The processed exhaust 52 is then expelled from the SCR assembly 41 through outlet 62 via an outlet mixer pipe 64. As the first exhaust flow path and the second exhaust flow path enter the outlet mixer pipe 64, the outlet mixer pipe 64 may further mix the mixture of the first portion of the exhaust solution 50 and the second portion of the exhaust solution 50.

Figure 5:
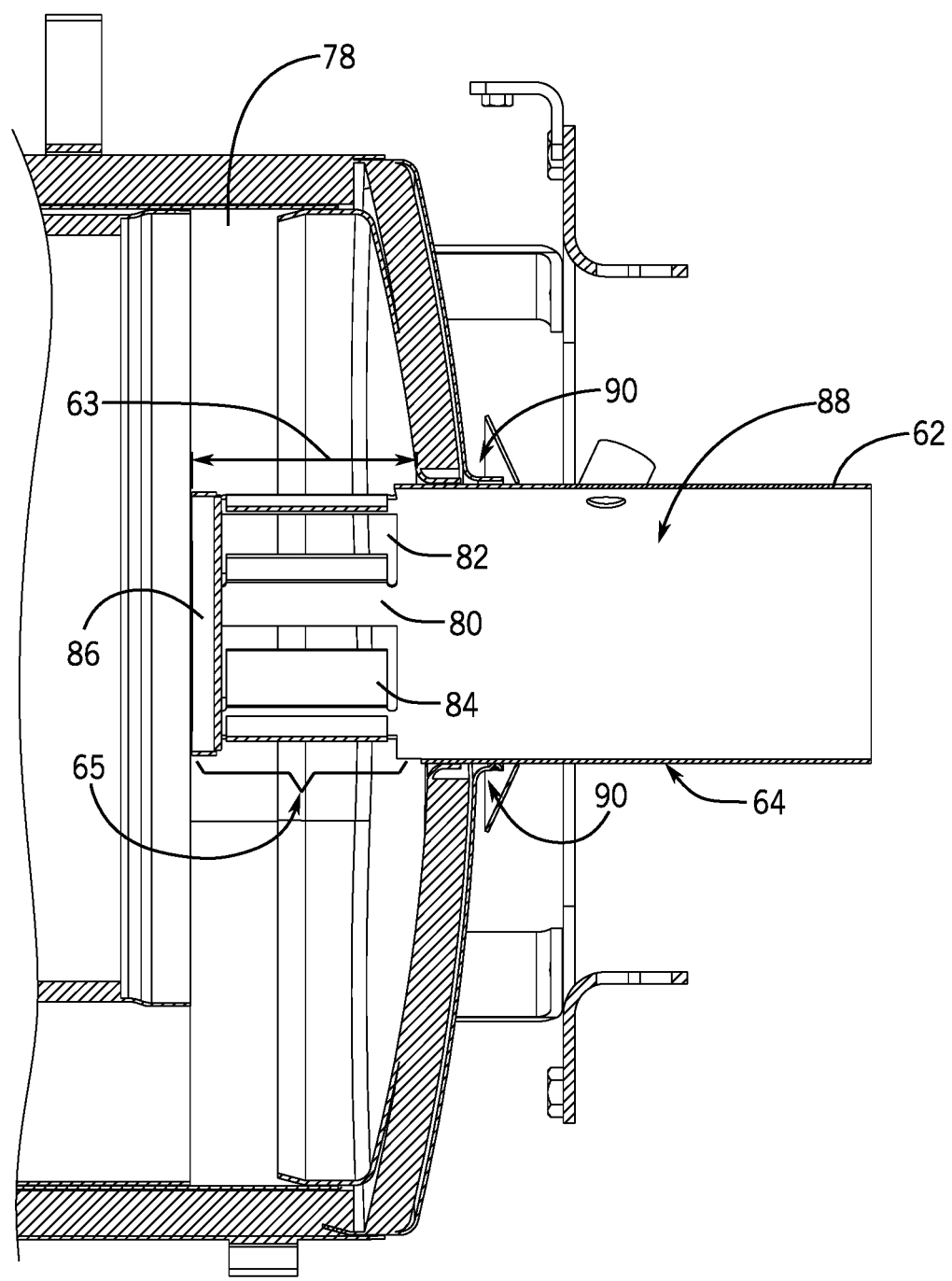
FIG. 5 is a cross-sectional view of an embodiment of an outlet mixer pipe that may be employed within the SCR assembly of FIG. 3.

FIG. 5 is a cross-sectional view of an embodiment of an outlet mixer pipe that may be employed within the SCR assembly of FIG. 3. As illustrated, the outlet mixer pipe 64 of the outlet 62 extends into the mixing region 78. The extended structure 65 of the outlet mixer pipe 64 in the mixing region 78 facilitates mixing of the first portion of the exhaust solution and the second portion of the exhaust solution by causing turbulence in the first portion of the exhaust solution, the second portion of the exhaust solution, or both. In certain embodiments, the extended structure 65 and the outlet mixer pipe 64 are separate components and coupled to each other during assembly.

In some embodiments, the cross-section of the extended structure 65 has a substantially circular shape. In some embodiments, the cross-section of the extended structure 65 may vary along the length 63 of the extended structure 65. For example, the cross-section of the extended structure 65 may change from a circular cross-section to another shape (e.g., ellipsoid, triangular, quadrilateral, etc.), or the cross-section may be a constant shape that is non-circular (e.g., ellipsoid, triangular, quadrilateral, etc.). In some embodiments, the cross-section of the extended structure 65 may maintain substantially the same shape, but the cross-sectional area may increase or decrease along the length 63 of the extended structure 65.

Additionally, the extended structure 65 of the outlet mixer pipe 64 may include one or more features that facilitate mixing of the first portion of the exhaust solution from the first exhaust flow path and the second portion of the exhaust solution from the second exhaust flow path. Such features, as further described herein, may include one or more slots 82 within a wall 80 of the outlet mixer pipe 64, one or more vanes 84 on the wall 80 of the outlet mixer pipe 64, one or more perforations within an end cap 86 of the outlet mixer pipe 64, or any combination thereof. In the illustrated embodiment, the extended structure 65 of the outlet mixer pipe 64 includes multiple vanes 84. As the first portion of the exhaust solution from the first exhaust flow path and the second portion of the exhaust solution from the second exhaust flow path enter the outlet mixer pipe and interact with the vanes 84, the vanes may induce a swirl in the first portion of the exhaust solution, the second portion of the exhaust solution, or both, thereby facilitating the mixing of the first portion of the exhaust solution and the second portion of the exhaust solution.

The outlet mixer pipe 64 includes sensors 88 for measuring characteristics of the exhaust solution (e.g., processed exhaust 52). Such sensors 88 may include one or more sensors for measuring the amount or the concentration of byproducts in the exhaust gas. For example, the SCR module 41 may include a NOx sensor, a $NH_3$ sensor, or both. In some embodiments, the SCR module 41 includes a temperature sensor. Each sensor 88 may be placed at any suitable location within the outlet mixer pipe 64 to measure characteristics of the exhaust gas. In some embodiments, the placement of each sensor 88 may be based on the expected composition of the exhaust gas mixture within the outlet mixer pipe 64. For example, if the mixture of the first and second portions of the exhaust solution is expected to be more uniform or more homogenous in one region within the outlet mixer pipe 64, the sensors 88 may be disposed within this region. In some embodiments, sensors 88 may be positioned in any other suitable location to measure characteristics of the processed exhaust 52.

Figure 6:
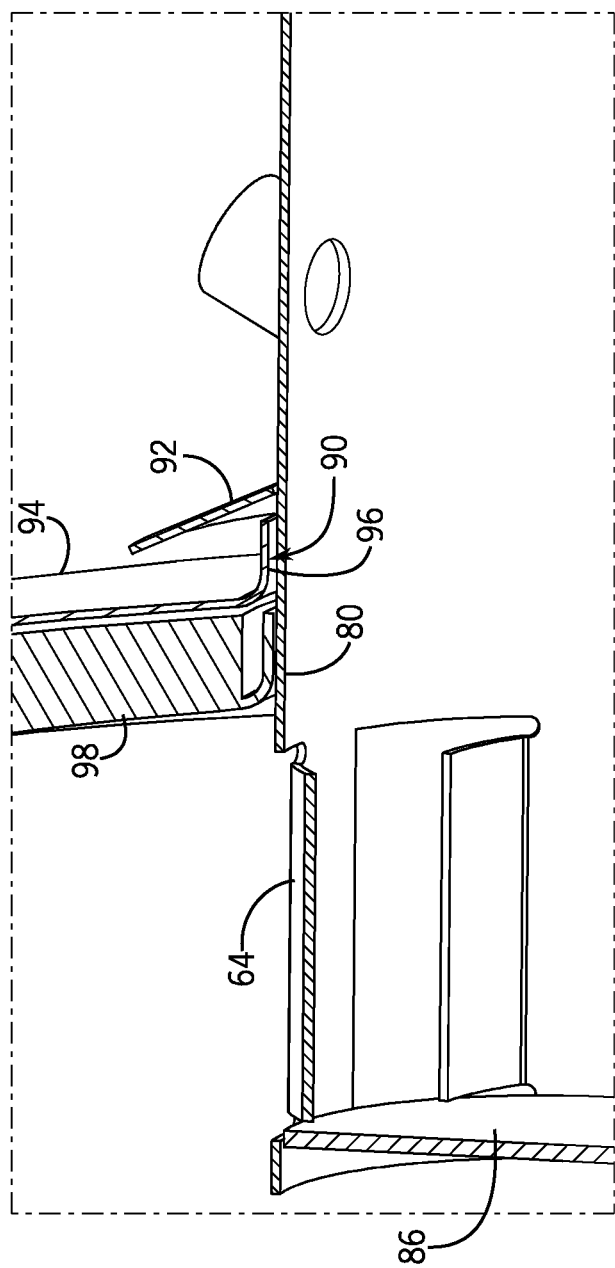
FIG. 6 is a detailed cross-sectional view of the outlet mixer pipe of FIG. 5.

FIG. 6 is a detailed cross-sectional view of the outlet mixer pipe 64 FIG. 5. A circumferential slip joint 90 connects the wall 80 of the outlet mixer pipe 64 and a mounting portion 94 of the SCR module housing 44. Accordingly, the circumferential slip joint 90 couples the outlet mixer pipe 64 to the SCR module housing 44. As illustrated, a gap 96 is formed between an exterior surface 94 of the SCR module housing 44 and an inner portion 98 of the SCR module housing 44. The gap 96 provides an insulating layer between the exterior surface 94 of the SCR module housing 44 and the inner portion 98 of the SCR module housing 44, thereby maintaining the external temperature of the SCR module housing 44 at a lower temperature relative to the interior of the SCR module 46. A circumferential rain shield 92 is coupled to the outlet mixer pipe 64 above the gap 96. The circumferential rain shield 92 blocks fluid, such as water, from entering gap 96. In the illustrated embodiment, the circumferential rain shield 92 extends at an angle relative to the outlet mixer pipe 64. In certain embodiments, the circumferential rain shield 92 may extend from the outer mixer pipe 64 at a ninety degree angle, a sixty degree angle, a forty-five degree angle, a thirty degree angle, or any other suitable angle to block fluid from entering gap 96. Additionally, the circumferential rain shield 92 may extend from outer mixer pipe 64 at a length suitable to block fluid from entering gap 96. In some embodiments, the outlet mixer pipe 64 may not be coupled to a circumferential rain shield. In some embodiments, the outlet mixer pipe 64 may be coupled to several rain shield segments around the circumference or the exterior surface of the outlet mixer pipe 64. The rain shield segments may each have an overlapping portion that either extends over or extends under a portion of an adjacent rain shield segment. In some embodiments, a threaded joint or any other suitable joint or fastener may couple the outlet mixer pipe 64 to the SCR module housing 44.

Figure 7:
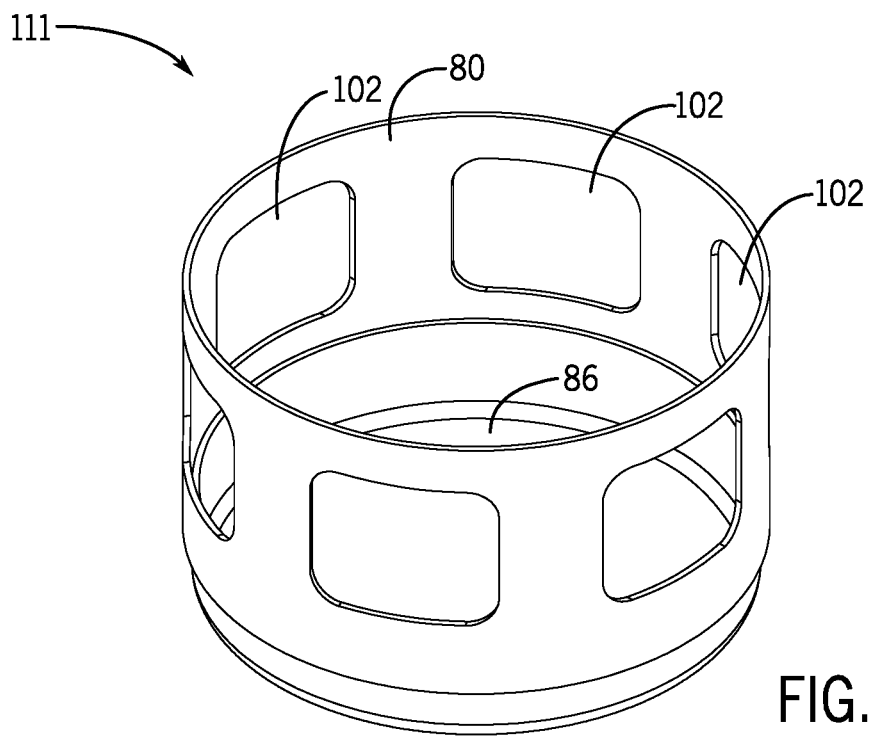
FIG. 7 is a perspective view of an embodiment of an extended structure of an outlet mixer pipe that may be employed within the SCR assembly of FIG. 3.
Figure 8:
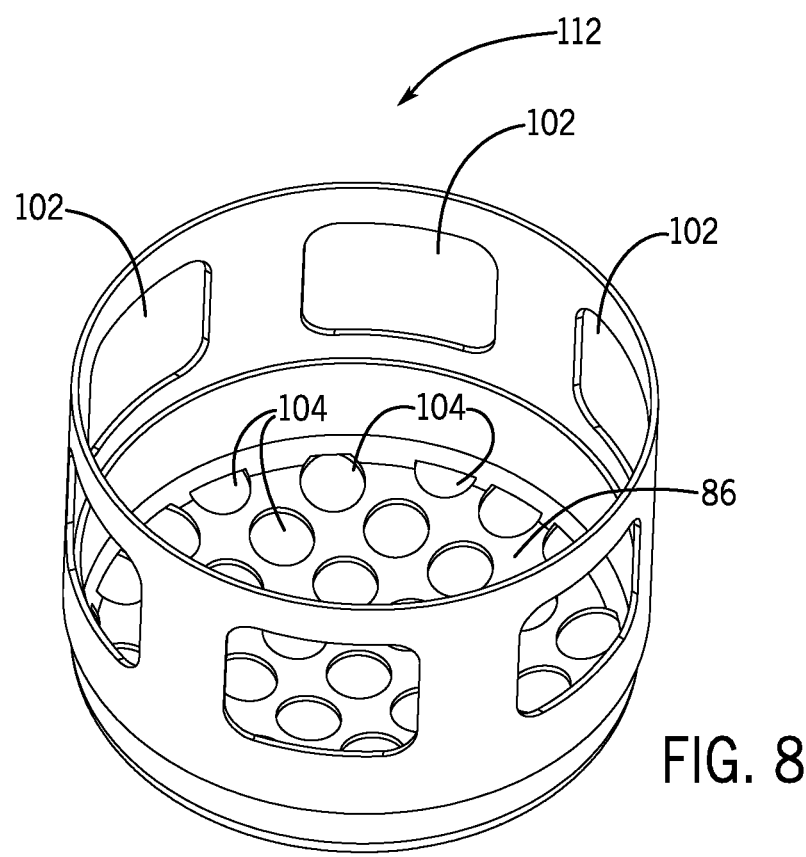
FIG. 8 is a perspective view of another embodiment of an extended structure of an outlet mixer pipe that may be employed within the SCR assembly of FIG. 3.
Figure 9:
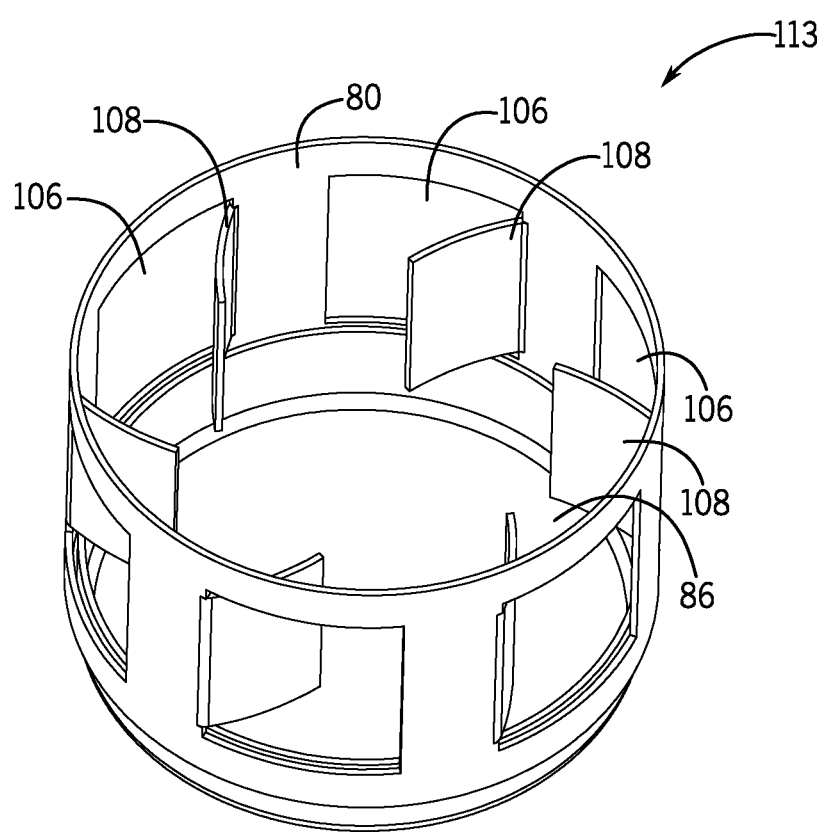
FIG. 9 is a perspective view of a further embodiment of an extended structure of an outlet mixer pipe that may be employed within the SCR assembly of FIG. 3.

FIGS. 7 to 9 are perspective views of various embodiments of the extended structure 65 of the outlet mixer pipe 64 that may be employed within SCR assembly 41 of FIG. 3. As described herein, the extended structure 65 of the outlet mixer pipe 64 may include one or more features for facilitating mixing of the first portion of the exhaust solution and the second portion of the exhaust solution within the SCR assembly as the first portion of the exhaust solution and the second portion of the exhaust solution interact with the features of the outlet mixer pipe 64. FIG. 7 is a perspective view of an embodiment of an extended structure 111 including six slots 102 in the wall 80 of the extended structure 111. As the mixture of the first and second portions of the exhaust solution enter the slots 102 in the wall 80 of the extended structure 111, the interaction between the first portion of the exhaust solution and the second portion of the exhaust solution with the slots 102 and the wall 80 of the extended structure 111 increases the mixing of the first portion of the exhaust solution and the second portion of the exhaust solution within the outlet mixer pipe 64. For example, the first and second portions of the exhaust solution may have a more uniform or distributed composition (e.g., as compared to a composition of the first and second portions of the exhaust solution entering an outlet without an extended structure with slots) within the outlet mixer pipe 64. In some embodiments, one slot, two slots, three slots, four slots, five slots, six slots, seven slots, eight slots, nine slots, ten slots, or more slots may be formed in the wall 80 of the extended structure 65 of the outlet mixer pipe 64. In some embodiments, the slots 102 may have the same size and/or the same shape as one another. For example, each slot may be have a circular shape, a triangular shape, a ellipsoidal shape, a quadrilateral shape, or any other suitable shape to facilitate mixing of the first and second portions of the exhaust solution. In some embodiments, at least one slot may have a different size and/or a different shape than other slot(s). For example, the extended structure 111 may include four slots. Two slots may have a quadrilateral shape, while the other two may have a circular shape. The configuration of the slots 102 within the outlet mixer pipe 64 may include any suitable number of slots, any suitable size(s) of slot(s), any suitable shape(s) of slot(s), or any combination thereof, for facilitating an enhanced homogeneity or mixing of the first and second portions of the exhaust solution within the outlet mixer pipe 64. As illustrated in FIG. 7, the extended structure 111 includes an end cap 86 without any features as described herein. In some embodiments, however, the end cap 86 of the extended structure 111 may include slots, perforations, vanes, or a combination thereof, as described herein. Additionally, any feature of the extended structure 111 may be included in any other suitable portion of the outlet mixer pipe 64.

FIG. 8 is a perspective view of another embodiment of an extended structure 112 including slots 102 in the wall 80 of the extended structure 65. Additionally, the extended structure 112 includes perforations 104 in an end cap 86 of the extended structure 112. As the mixture of the first and second portions of the exhaust solution enter the slots 102 in the wall 80 and the perforations 104 in the end cap 86, the interaction between the first portion of the exhaust solution and the second portion of the exhaust solution with the slots 102, the wall 80, the perforations 104, and the end cap 86 increases the mixing of the first portion of the exhaust solution and the second portion of the exhaust solution within the outlet mixer pipe 64. In some embodiments, one perforation, two perforations, three perforations, four perforations, five perforations, six perforations, seven perforations, eight perforations, nine perforations, ten perforations, or more perforations may be included in the end cap 86 of the extended structure 65 of the outlet mixer pipe 64. In some embodiments, the perforations 104 may have the same size and/or the same shape as one another. For example, each perforation may have a circular shape, a triangular shape, an ellipsoidal shape, a quadrilateral shape, or any other suitable shape to facilitate mixing of the first and second portions of the exhaust solution. In some embodiments, at least one perforation may have a different size and/or a different shape than other perforation(s). For example, the extended structure 112 may include at least one circular perforation and at least one quadrilateral-shaped perforation. Additionally, the shape of one or more perforations may vary based on proximity to the wall 80. For example, a perforation in the outer circumferential area of the end cap 86 may have a substantially circular shape that ends at the wall 80 of the extended structure 65. The configuration of the perforations 104 within the end cap 86 of the outlet mixer pipe 64 may include any suitable number of perforations, any suitable size(s) of perforation(s), any suitable shape(s) of perforation(s), or any combination thereof, for facilitating an enhanced homogeneity or mixing of the first and second portions of the exhaust solution within the outlet mixer pipe 64. Additionally, the configuration of the slots 102 in the wall 80 of the extended structure 65 may vary as described above with regard to the slots 102 of FIG. 7. In some embodiments, the extended structure 112 may not have any slots in the wall 80 of the extended structure 112. Further, any feature of the extended structure 112 may be included in any other suitable portion of the outlet mixer pipe 64.

FIG. 9 is a perspective view of a further embodiment of an extended structure 113 including vanes 108 extending from the wall 80 of the extended structure 113. The vanes 108 extend toward the center of the outlet mixer pipe 64, to enable the outlet mixer pipe 64 to couple to the SCR module housing 44 via an opening in the exterior surface 94 of the SCR module housing 44, as depicted in FIGS. 4-6. In some embodiments, one vane, two vanes, three vanes, four vanes, five vanes, six vanes, seven vanes, eight vanes, nine vanes, ten vanes, or more vanes may be included in the extended structure 113 of the outlet mixer pipe 64. In some embodiments, the vanes 108 may have the same size and/or the same shape as one another. For example, each vane may have a quadrilateral shape, a trapezoidal shape, a half-circle or a half-ellipsoidal shape, or any other suitable shape to facilitate mixing of the first and second portions of the exhaust solution. In some embodiments, at least one vane may have a different size and/or a different shape than other vane(s). For example, the extended structure 113 may include at least one quadrilateral-shaped vanes and at least one half-ellipsoidal shaped vanes. Additionally, the extended structure 113 includes slots 106 in the wall 80 of the extended structure 113. The vanes 108 may extend from either circumferential side of the slots 106 in the wall 80 of the extended structure 65. For example, each vane 108 may extend from the left side of a respective slot 106, or each vane 108 may extend from the right side of a respective slot 106. The vanes 108 extend from the wall 80 of the extended structure 113 at an angle relative to the wall 80. For example, the vanes 108 may extend from the wall 80 at a twenty degree angle, a twenty-five degree angle, a thirty degree angle, a thirty-five degree angle, a forty degree angle, a forty-five degree angle, or any other suitable angle to enhance homogeneity or mixing of the first and second portions of the exhaust solution within the outlet mixer pipe 64.

In some embodiments, the direction in which each vane 108 extends may alternate among the vanes. In some embodiments, at least one slot may not have a respective vane extending from a circumferential side of the slot, or at least one vane may not be associated with a respective slot. In certain embodiments, an end cap of the extended structure may include perforations such as those described above with respect to FIG. 8. Although FIG. 9 illustrates a specific configuration of the vanes 108 and the slots 106 of the extended structure 113, the configuration may consist of any suitable number of vane(s), any suitable number of slot(s), and any suitable size(s) or shape(s) thereof to facilitate enhanced homogeneity or mixing of the first and second portions of the exhaust solution within the outlet mixer pipe 64. Additionally, any feature of the extended structure 113 may be included in any other suitable portion of the outlet mixer pipe 64. As the mixture of the first portion of the exhaust solution and the second portion of the exhaust solution enter the slots 106 in the wall 80, the interaction between the first portion of the exhaust solution and the second portion of the exhaust solution with the slots 106, the wall 80, and the vanes 108 increases the mixing of the first and second portions of the exhaust solution within the outlet mixer pipe 64. For example, the first and second portions of the exhaust solution may have a more uniform or distributed composition (e.g., as compared to the composition of the first and second portions of the exhaust solution entering an outlet without an extended structure with slots and/or vanes) within the outlet mixer pipe 64. A swirl may also be induced in the mixture of the first and second portions of the exhaust solution within the outlet mixer pipe 64.

While only certain features and embodiments have been illustrated and described, many modifications and changes may occur to those skilled in the art. It is, therefore, to be understood that the appended claims are intended to cover all such modifications and changes as fall within the true spirit of the disclosure.

The techniques presented and claimed herein are referenced applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any elements containing elements designated in any other manner, it is intended that such elements are not to be interpreted under 35 U.S.C. 112(f).

The invention claimed is:

1. An exhaust system for a work vehicle comprising:
a selective catalytic reduction (SCR) assembly comprising:
an SCR housing comprising an exterior portion and an inner portion that forms an inner volume of the SCR housing, wherein a first segment of the exterior portion is spaced apart from the inner portion by a gap;
an SCR module comprising a first exhaust flow path and a second exhaust flow path;
an inlet configured to receive a flow of an exhaust solution, to direct a first portion of the exhaust solution to the first exhaust flow path, and to direct a second portion of the exhaust solution to the second exhaust flow path; and
an outlet mixer configured to receive the first and second portions of the exhaust solution and to direct the first and second portions of the exhaust solution out of the SCR module, wherein the outlet mixer comprises one or more features configured to mix the first and second portions of the exhaust solution, and wherein the gap extends between a second segment of the exterior portion of the SCR housing transverse to the first segment of the exterior portion of the SCR housing and a wall of the outlet mixer.

2. The exhaust system of claim 1, wherein the one or more features comprise one or more slots in a wall of the outlet mixer.

3. The exhaust system of claim 2, wherein the one or more features comprise one or more perforations in an endcap of the outlet mixer.

4. The exhaust system of claim 1, wherein the one or more features comprise one or more vanes extending from a wall of the outlet mixer.

5. The exhaust system of claim 4, wherein the one or more vanes extend inwardly from the wall of the outlet mixer toward a center of the outlet mixer.

6. The exhaust system of claim 4, wherein the one or more features comprise one or more slots in the wall of the outlet mixer.

7. The exhaust system of claim 1, wherein the one or more features are configured to mix the first and second portions of the exhaust solution by inducing a swirl into the first portion of the exhaust solution, the second portion of the exhaust solution, or both.

8. The exhaust system of claim 1, comprising one or more sensors configured to measure NOx, NH3, or a combination thereof, in a mixture of the first and second portions of the exhaust solution within the outlet mixer.

9. The exhaust system of claim 1, wherein the outlet mixer is coupled to a housing of the SCR assembly via a circumferential slip joint.

10. A selective catalytic reduction (SCR) assembly, comprising:
an SCR housing comprising an exterior portion and an inner portion that forms an inner volume of the SCR housing, wherein the exterior portion is spaced apart from the inner portion by a gap;

a first exhaust flow path passing through a first catalyst, wherein the first exhaust flow path includes a first passage and a second passage substantially perpendicular to the first passage;

a second exhaust flow path passing through a second catalyst, wherein the second exhaust flow path includes a third passage and a fourth passage substantially perpendicular to the third passage;

an inlet configured to receive a flow of an exhaust solution, to direct a first portion of the exhaust solution to the first exhaust flow path, and to direct a second portion of the exhaust solution to the second exhaust flow path; and an outlet mixer configured to receive the first and second portions of the exhaust solution and to direct first and second portions of the exhaust solution out of the SCR module, wherein the outlet mixer comprises one or more features configured to mix the first and second portions of the exhaust solution, wherein the outlet mixer is coupled to the SCR housing via a circumferential slip joint, and the gap extends between a segment of the exterior portion of the SCR housing and a wall of the outlet mixer near the circumferential slip joint.

11. The SCR assembly of claim 10, wherein the one or more features are configured to mix the first and second portions of the exhaust solution by inducing a change in momentum in the first portion of the exhaust solution, the second portion of the exhaust solution, or both.

12. The SCR assembly of claim 10, comprising a NOx sensor configured to measure a concentration of NOx within a mixture of the first and second portions of the exhaust solution.

13. The SCR assembly of claim 10, wherein the outlet mixer has a substantially cylindrical shape.

14. The SCR assembly of claim 10, wherein the one or more features comprise one or more slots within a wall of the outlet mixer, one or more perforations in an end cap of the outlet mixer, or a combination thereof.

15. The SCR assembly of claim 10, wherein the one or more features comprise one or more slots within a wall of the outlet mixer, one or more vanes extending from the wall of the outlet mixer, or a combination thereof.

16. An exhaust system for a work vehicle comprising:
a selective catalytic reduction (SCR) assembly comprising:
an SCR housing comprising an exterior portion and an inner portion that forms an inner volume of the SCR housing, wherein the exterior portion is spaced apart from the inner portion by a gap;
an SCR module disposed within the interior of the SCR housing, wherein the SCR module comprises a first exhaust flow path and a second exhaust flow path; and
an outlet mixer configured to receive a first portion of an exhaust solution from the first exhaust flow path and a second portion of the exhaust solution from the second exhaust flow path, and to direct the first and second portions of the exhaust solution out of the SCR assembly, wherein the outlet mixer comprises one or more features configured to mix the first and second portions of the exhaust solution, and wherein the gap extends between a segment of the exterior portion of the SCR housing and a wall of the outlet mixer.

17. The exhaust system of claim 16, wherein the wall of the outlet mixer is coupled to the SCR housing via a circumferential slip joint.

18. The exhaust system of claim 16, comprising a NOx sensor configured to measure a concentration of NOx within a mixture of the first and second portions of the exhaust solution.

* * * * *